US005749328A

United States Patent [19]
Guillet

[11] Patent Number: 5,749,328
[45] Date of Patent: May 12, 1998

[54] BOILER FOR HEATING A WORKING FLUID

[75] Inventor: Rémi Guillet, Pierrefitte, France

[73] Assignee: Gaz de France, Paris, France

[21] Appl. No.: 559,063

[22] Filed: Nov. 16, 1995

[30] Foreign Application Priority Data

Nov. 16, 1994 [FR] France ................... 94 13689

[51] Int. Cl.$^6$ .................................................. F22B 1/02
[52] U.S. Cl. ...................... 122/31.1; 122/31.2; 122/209.1
[58] Field of Search .......................... 122/31.1, 31.2,
122/209.1, 209.2, 223, 5.52, 17

[56] References Cited

U.S. PATENT DOCUMENTS

| 1,877,640 | 9/1932 | Baumann | 122/31.1 |
|---|---|---|---|
| 4,393,815 | 7/1983 | Pedersen et al. | 122/31.1 |
| 5,097,802 | 3/1992 | Clawson | 122/31.1 |
| 5,259,341 | 11/1993 | Person | 122/31.1 |

FOREIGN PATENT DOCUMENTS

| 281234 | 8/1990 | Germany | 122/31.1 |
|---|---|---|---|
| 2 031 572 | 4/1980 | United Kingdom . | |
| 2031572 | 4/1980 | United Kingdom . | |
| 2 112 517 | 7/1983 | United Kingdom . | |
| 2112517 | 7/1983 | United Kingdom . | |

OTHER PUBLICATIONS

1142 Revue de l'Instuit Francais du Petrole 48 (1993) Mar./Apr., No. 2, Paris France, Mar. 1993.

*Primary Examiner*—William Doerrler
*Attorney, Agent, or Firm*—Bacon & Thomas

[57] ABSTRACT

A boiler for heating a working fluid includes a first module containing the hearth, a burner fed by said fuel gas, and an internal water circuit for wetting the hearth and creating a first level of mass and heat exchange due to vaporization without heat transfer to the working fluid; a second module including an exchanger-condenser associated with the circuit portion for circulating the working fluid and receiving the combustion gases laden with water vapor coming from the hearth of the first module and a third module including a water vapor pump providing a third level of mass and heat exchange between the combustion gases coming from the second module and the oxidizing air injected into the enclosure via an air inlet, with a device for directing the oxidizing air to the first module after it has been heated and wetted by passing through the third module.

12 Claims, 3 Drawing Sheets

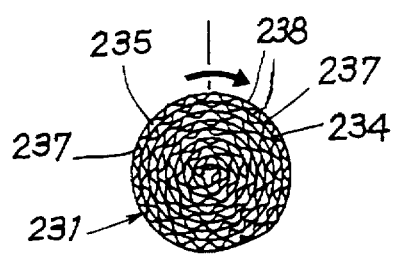
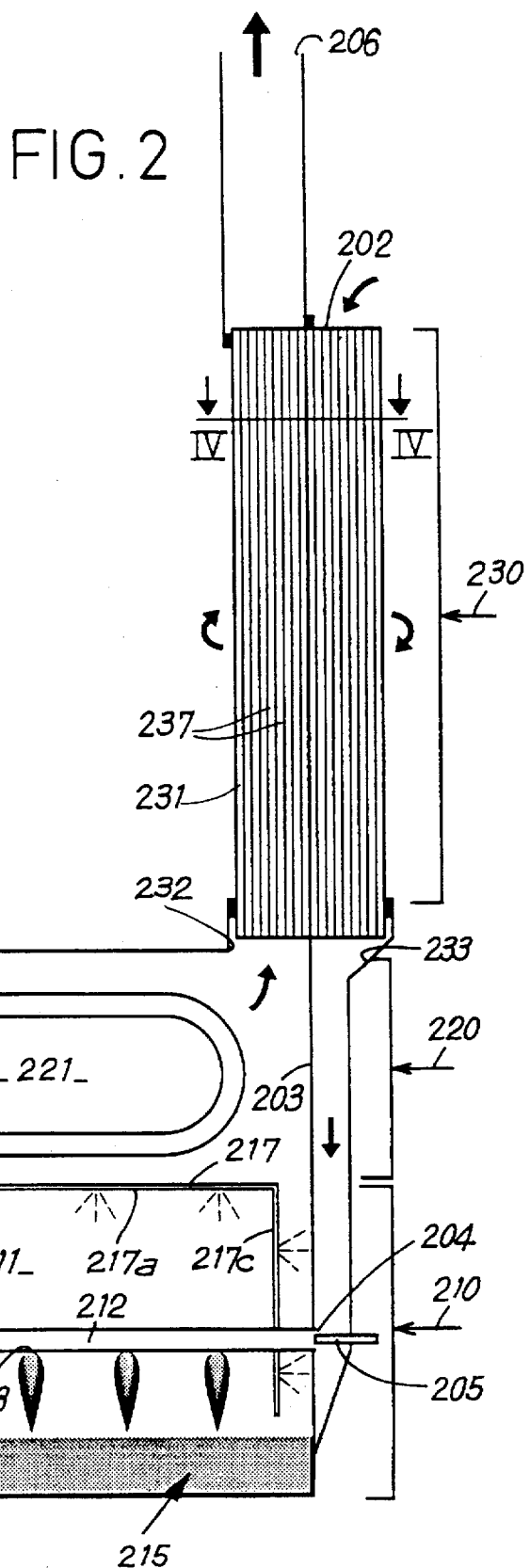

BOILER FOR HEATING A WORKING FLUID

The present invention relates to a boiler for heating a working fluid, the boiler comprising an enclosure into which there penetrates at least one circuit portion for circulating the working fluid, and a hearth which is situated inside the enclosure and in which a fuel gas is subjected to combustion.

BACKGROUND OF THE INVENTION

Various technologies are already known for use in boilers that are intended to heat a working fluid, and in particular boilers for producing hot tap water or hot water for central heating.

For several years, efforts have been made to improve the energy and ecology performance of such heat generators.

When possible with a given fuel, recuperators of all kinds are suggested by manufacturers for improving the thermal efficiency of their machines.

Nevertheless, the recuperators proposed are generally additional items that are bulky, expensive, and give rise to large headlosses.

In addition, in existing apparatuses, flames that are often very hot as is generally required for better heat transfer, particularly within the hearth, also generate large amounts of nitrogen oxides.

In order to improve the energy and ecology performance of such heat generators, proposals have already been made to implement a water vapor pump which constitutes a final heat exchanger for exchanging mass and heat between the combustion gases leaving a heat generator and the oxidizing air before it reaches the burner. Under such circumstances, nearly all of the enthalpy of the combustion gases is recovered, both sensible heat and latent heat, even when the condensation recuperator of the water vapor pump is irrigated by a relatively hot inlet fluid whose temperature is greater than about 60° C. for example (i.e. the dew point temperature in stoichiometric combustion of methane).

The water vapor pump effect is also beneficial ecologically-speaking since the water vapor recycled with the oxidizing air lowers the adiabatic combustion temperature and the oxygenation ratio of the oxidizing air. These two factors play a very important part in the formation of nitrogen oxides (NOX).

Nevertheless, and as a general rule, water vapor pumps have likewise been designed as separate assemblies which are placed beside more conventional heat generators, thereby increasing cost, bulk, and headlosses, and preventing optimization of the overall process of producing heat.

In some countries, the technological approach to hot water generators has also given rise to direct contact generators being developed (direct contact between hot combustion products and a water circuit). This is particularly true when using water to heat open-loop processes. Under such circumstances, that type of generator can be highly advantageous, both on investment and in operation, since the incoming water generally has a very low temperature close to the outside ambient temperature and since there are no heat exchanger walls between the combustion gases and the working fluid.

In addition, by always cooling the chemically reacting products quickly there is a tendency to obtain a "quenching" effect on the flame, which quenching also encourages a reduction in NOX formation.

Nevertheless, two conditions must be scrupulously satisfied when considering direct contact generators:

one concerns chemical compatibility between the combustion gases and the working fluid; and the other concerns the temperature of the incoming working fluid which must advantageously remain well below the dew point temperature of the combustion products (e.g. equal to 60° C. for stoichiometric combustion of methane at normal atmospheric pressure).

Above the dew point temperature, the generator becomes a water vapor generator (or a generator of combustion gases laden with water vapor at atmospheric pressure).

Apart from a few very special applications, direct contact heat generators cannot be considered if the temperature of the incoming working fluid (generally liquid water) exceeds 60° C.

The main drawbacks of direct contact generators are thus specifically associated with direct contact: problems of chemical compatibility; difficulty of preventing vaporization of the working fluid in the final heat exchange zones. Those two types of constraint have considerably limited the development of direct contact heat generators.

OBJECTS AND SUMMARY OF THE INVENTION

A specific object of the present invention is to remedy the above-mentioned drawbacks, and it seeks to optimize the processes of mass and heat exchange within a single enclosure.

More particularly, the invention seeks to provide the boiler with heat efficiency that is always at a maximum, even when the temperature of the working fluid penetrating into the boiler lies in the range about 60° C. to about 80° C., for example, while still ensuring maximum ecological efficiency to the combustion by keeping down the quantities of nitrogen oxides that are formed.

According to the invention, these objects are achieved by a boiler for heating a working fluid, the boiler comprising an enclosure into which there penetrates at least one circuit portion for circulating the working fluid, and a hearth which is situated inside the enclosure and in which a fuel gas is subjected to combustion, wherein the boiler comprises at least:

a) a first module containing the hearth, a burner fed by said fuel gas, and an internal water circuit for wetting the hearth and creating a first level of mass and heat exchange due to vaporization without heat transfer to the working fluid;

b) a second module comprising an exchanger-condenser associated with said circuit portion for circulating the working fluid and receiving the combustion gases laden with water vapor coming from the hearth of the first module to create a second level of mass and heat exchange due to condensation transferring the heat energy produced in the first module to an external circuit for working fluid circulation without there being direct contact between the combustion gases and the working fluid; and c) a third module comprising a water vapor pump providing a third level of mass and heat exchange between the combustion gases coming from the second module and the oxidizing air injected into the enclosure via an air inlet, means being provided to direct the oxidizing air to the first module after it has been heated and wetted by passing through the third module, thereby enabling the heated and wetted air to be mixed inside the burner with the fuel gas.

Advantageously, the internal water circuit comprises devices for injecting water into the top of the wet hearth and devices for projecting water against the vertical side walls of the hearth so as to wet all of the flow of combustion gas in the first module and the vertical walls of the hearth.

Preferably, the internal water circuit comprises a supply of water at the bottom of the first module, overflow means for removing excess water from said supply, and means for taking water from said supply to feed said internal water circuit.

The boiler of the invention thus constitutes a generator which operates by successive mass exchanges with the combustion products in three superposed modules, i.e. exchanges in which the combustion products are caused to change phase in each module.

The first mass and heat exchange in the first module consists in vaporization.

This exchange takes place in the "hearth" which becomes a zone of direct exchange between the flame and an environment that is very wet because of the injected water spray circulating in a closed circuit.

At this level, the combustion products are subjected to a "quenching" effect and they saturate at a temperature close to 95° C. Should it be desired to superheat the gases, then the water flow rate could be adjusted accordingly.

In industry, the quenching phenomenon is essential for reducing the formation of nitrogen oxides due to combustion with atmospheric air.

This first exchange in a "wet hearth" therefore gives rise to no heat transfer to the external user process or to the heat-conveying fluid (the working fluid).

The second mass and heat exchange in the second module consists in condensation.

Since the combustion energy has taken the form of a gas that is moderately hot and very rich in water vapor, the transfer of energy to the working fluid takes place solely via the exchanger-condenser integrated in the second module of the generator. This heat exchange is indirect, only.

Naturally, whatever the material from which the condenser is made, it benefits from high heat transfer coefficients on the gas side since heat exchange takes place essentially by condensation.

The third mass and heat exchange in the third module consists essentially in condensation in the flue gases coupled with evaporation in the oxidizing air.

Because of the mass and heat exchange between the gases leaving the condenser and the oxidizing air before it enters the burner, the residual enthalpy contained in the gases at the outlet from the condenser is recycled with the oxidizing air, thereby ensuring maximum thermal efficiency for the boiler, independently of the temperature of the fluid entering the exchanger-condenser, and it also ensures ecological efficiency which, by the combined effects of flame quenching and of oxidizing air wet with water vapor pump, makes it possible to divide the quantity of nitrogen oxides formed by a factor lying in the range about 10 to about 20 compared with combustion using the same burner but without flame quenching and with atmospheric air injected directly into the burner.

The boiler of the present invention may be embodied in various different ways.

Thus, in a first possible embodiment, the third module comprises an exchanger having a porous ceramic, hydrophilic, or porous membrane organized in one or more layers, each layer having one face in contact with the oxidizing air injected via said air inlet and its other face in contact with the combustion gases coming from the second module to perform the mass and heat exchange function.

In a second possible embodiment, the third module comprises a rotary exchanger of the honeycomb type constituted by a corrugated plate between two flat plates that are rolled up together, the exchanger being placed vertically, receiving at its bottom end the combustion gases from the second module and at its top end the oxidizing air injected via an air inlet, with the oxidizing air flowing as a counterflow to the combustion gases towards said means for directing the heated and wetted oxidizing air towards the first module, while the combustion gases are exhausted via a stationary chimney at the top of the rotary exchanger.

In a third possible embodiment, the third module comprises firstly a scrubber-evaporator disposed beneath the first module and having oxidizing air passing upwards through it from said air inlet located at one end of said scrubber-evaporator to be subsequently exhausted by said means for directing heated oxidizing air towards the first module, water being applied downwardly to the scrubber-evaporator from said supply of water situated at the bottom of the first module, and secondly a scrubber-condenser disposed above the second module so that the combustion gases leaving the second module pass upwardly through it, and so that the water recovered in an additional supply after passing through the scrubber-evaporator passes through it downwardly.

In which case, the boiler advantageously comprises a corrugated plate provided with perforations situated near the tops of the corrugations to define said supply of water at the bottom of the wet hearth and for dispensing the water in highly divided form over the entire section of the scrubber-evaporator.

The boiler may comprise pumping means and dispensing means for feeding both the water circuit of the first module and the water dispensing circuit in the scrubber-condenser from said additional supply which acts as a "hydraulic return".

The boiler may also comprise a corrugated plate having perforations situated in the vicinity of the tops of the corrugations to allow the combustion gases to pass from the second module containing an exchanger-condenser to the scrubber-condenser while simultaneously taking the flow of water collected from the bottom of the scrubber-condenser and directing it in the form of an appropriately sloping jet against the vertical walls of the boiler so as to avoid showering water onto the exchanger-condenser.

BRIEF DESCRIPTION OF THE DRAWINGS

Other characteristics and advantages of the invention appear more clearly on reading the detailed description of particular embodiments, given with reference to the accompanying drawings, in which:

FIG. 2 is a diagrammatic vertical section view of a second embodiment of a boiler of the invention having three levels of mass and heat exchange;

FIG. 4 is a section on line IV—IV of FIG. 2 showing an implementation detail of a rotary exchanger.

MORE DETAILED DESCRIPTION

Figure 1:
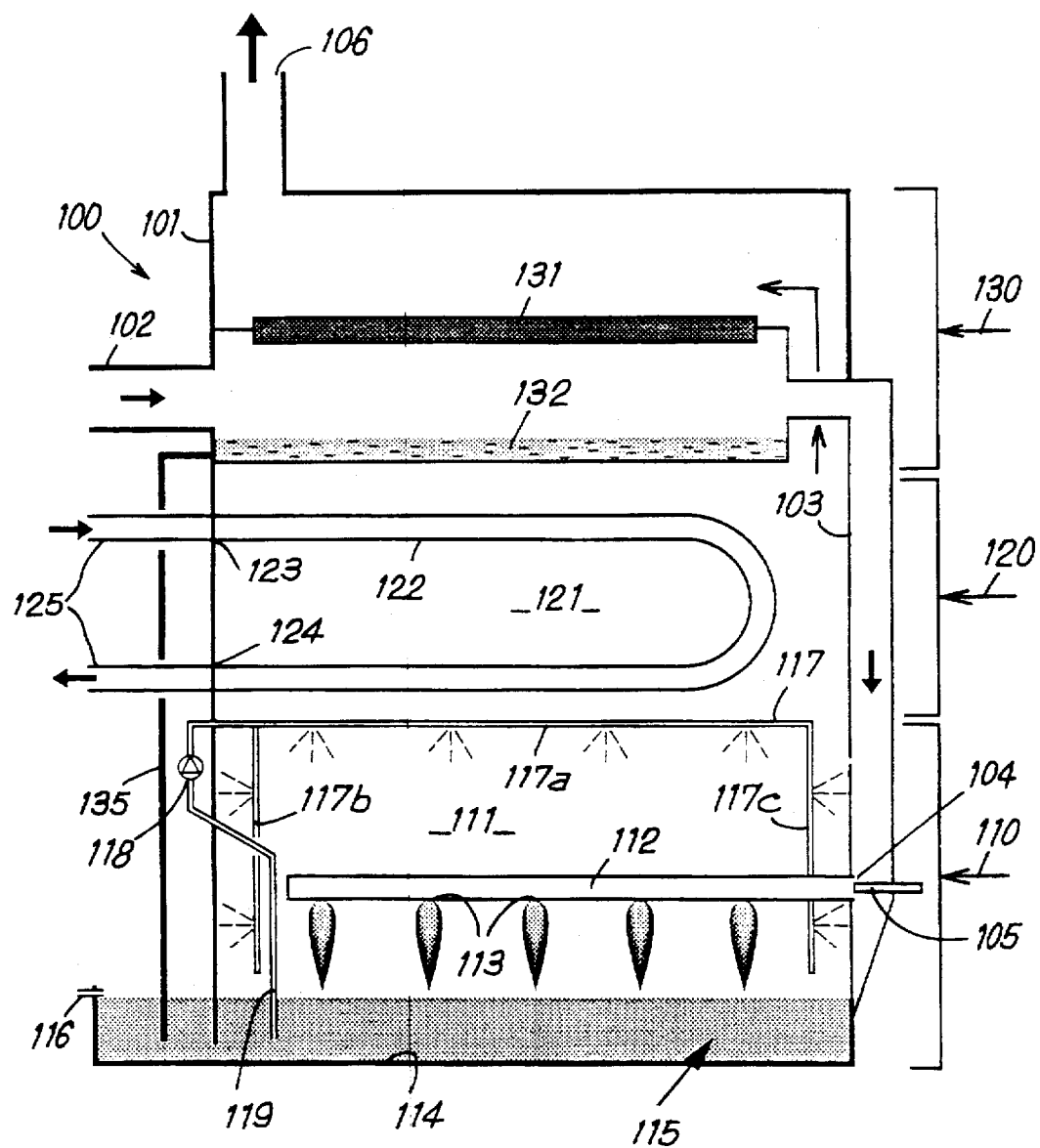
FIG. 1 is a diagrammatic vertical section view of a first embodiment of a boiler of the invention having three levels of mass and heat exchange.

FIG. 1 shows a first embodiment of a boiler 100 for heating a working fluid circulating in a circuit 125, a portion 122 of the circuit penetrating into the enclosure 101 of the boiler to enable heat exchange to take place in a middle level of the boiler 100 between the combustion products from a hearth 111 and the working fluid which circulates in the circuit 125 and in the portion 122, which working fluid is thus confined inside pipework, thereby preventing any direct contact with the combustion products.

The bottom portion of the boiler 100 constitutes a first module 110 having the hearth 111 with a burner 112 located at the bottom thereof, which burner is advantageously constituted by one or more strips provided with orifices that are advantageously downwardly directed so that the flames extend downwards towards a supply of water 115 which constitutes a reserve in a receptacle 114 fitted with an overflow 116. The burner 112 is fitted with a feed nozzle 105 for a fuel gas, e.g. for natural gas, and a passage 104 for injecting oxidizing air that has been heated and wetted and that is delivered by a duct 103 coming from a third module 130 situated in the top of the boiler 100 and constituting a water vapor pump.

An internal water circuit 117 is disposed in the first module 110 to wet the hearth 111 and to create first level of mass exchange in a wet atmosphere without heat being transferred to the working fluid.

The internal water circuit 117 has horizontal spray strips 117a situated in the top of the first module 110 and possessing downwardly directed spray nozzles for injecting water in divided form into the top portion of the hearth 111 and wetting all of the combustion gas flow present in the hearth 111.

Other water spraying strips 117b and 117c are disposed vertically beyond the ends of the burner strips 112 and have spray nozzles directed towards the vertical walls of the enclosure 101 defining the hearth 111 so as to wet the vertical walls of the hearth.

A pump 118 connected to a pipe 119 dipping into the supply of water 115 enables water to be taken from the supply 115 and to be fed to the spray strips 117a, 117b, and 117c, thereby defining a closed circuit 117, with any water sprayed into the hearth or running down the walls of the enclosure 101 without being vaporized then being recovered in the receptacle 114.

The combustion products from the hearth 111 and mixed with water vapor are directed upwards into the second module 120 which is still inside the same enclosure 101 and constitutes an exchanger-condenser 121. The working fluid circulating in an external circuit 125 is introduced into the boiler 100 via an inlet 123 of the portion 122 of the working fluid circuit situated inside the second module 120 that constitutes the exchanger-condenser 121, and it leaves the boiler 100 for the external circuit 125 via an outlet 124 from the circuit portion 122.

The working fluid may be of various different kinds, given that it does not come into contact with the combustion products from the hearth 111, and in particular it may be constituted by hot tap water or by water of a central heating system. The efficiency of the boiler 100 is not limited by the inlet temperature of the working fluid at the inlet 123. However, the boiler is particularly well adapted to standardized installations for which the working fluid at the inlet 123 has a temperature lying in the range 60° C. to 80° C., typically 70° C., and a temperature at the outlet 124 lying in the range about 80° C. to about 95° C., typically 90° C.

Thus, within the second module 120 there is created a second level of mass exchange that transfers the heat energy produced in the bottom module 110 to the external circuit 125 for working fluid circulation without there being any direct contact between the combustion products and the working fluid.

In the top portion of the boiler 100 and still within the enclosure 101, a third module 130 constitutes a water vapor pump for providing mass and heat exchange between the combustion gases coming from the exchanger-condenser 121 that have already lost a large fraction of the water vapor which has condensed, but which are still somewhat wet, and the fresh and relatively dry oxidizing air which is injected from outside the boiler 100 via an air inlet 102, and which, after being heated and wetted in the third module 130, is directed via the duct 103 to the air inlet 104 for feeding the burner 112 with oxidizing air.

In the embodiment of FIG. 1, the water vapor pump essentially comprises a heat exchanger 131 having a membrane that is porous, hydrophilic, or ceramic, and that is in one or more layers, each layer having one face in contact with the oxidizing air injected via the air inlet 102, and its other face in contact with the combustion gases from the exchanger-condenser 121. For example, the combustion gases brought into contact with the top face of the membrane 131 lose substantially all of their residual moisture and may be exhausted via an outlet chimney 106 disposed at the top of the boiler 100. The water that comes from condensation of the residual water vapor contained in the combustion products passes through the membrane 131 that serves as an exchange wall. The liquid water passing through the membrane provides gas sealing between the two faces of the membrane, and after migrating through the pores of the membrane 131 it can be transformed into water vapor in the oxidizing air which becomes hot and wet. Any excess water is recovered in a receptacle 132 situated beneath the exchanger 131 and the zone through which the oxidizing air passes, and it is delivered by a pipe 135 to the receptacle 114 containing the supply of water 115.

The boiler 100 has three levels of mass exchange, and because of the effect of the combustion products being quenched within the wetted hearth 111, the presence of a module constituting a water vapor pump, it makes it possible to reduce nitrogen oxide formation. In addition, the thermal efficiency of the generator is at a maximum as mentioned above in the introduction of the present description.

By way of example, using oxidizing air injected at a temperature of about 15° C. via the air inlet 102, and with a working fluid having a temperature of about 70° C. at the inlet 123 and a temperature of about 90° C. at the outlet 124, the combustion products formed in the hearth 111 may saturate at a temperature of about 95° C., while the flow rate of water in the circuit 117 is adjustable should it be desired to superheat the gases. The combustion products may have a temperature of about 75° C. on leaving the exchanger-condenser 121 and a temperature of about 58° C. in the chimney 106 after passing through the water vapor pump of the third module 130. Oxidizing air injected at about 15° C. via the air inlet 102 may leave the third module 130 via the duct 103 saturated with water vapor and at a temperature of about 65° C.

The invention can be embodied in various different ways. Thus, FIG. 2 shows a boiler 200 in which the first and second modules 210, 220 are entirely similar to the first and second modules 110, 120 of the boiler 100 in FIG. 1. That is why these modules 210 and 220 are not described again and the various component parts of the modules 210 and 220 are given references that are similar to those for the corresponding parts of the modules 110 and 120 of FIG. 1, with only the hundreds digit "1" being replaced by a "2".

In contrast, in the boiler 200 of FIG. 2, the third module 230 does not include a porous membrane exchanger, but comprises a water vapor pump constituted by a vertical cylindrical rotary exchanger 231 of the honeycomb type made of corrugated sheets 237 engaged between two flat sheets 238 that are wound concentrically about the axis of the cylinder and that provide counterflow passages firstly for the combustion products coming up from the exchanger-condenser 221 which flow upwards from a fixed inlet 232 situated at the bottom of the rotary exchanger 231 to a fixed chimney 206 situated at the top of the exchanger 231, and secondly for oxidizing air injected down via an air inlet 202 situated at the top of the exchanger 231 and travelling downwards through the exchanger 231 to a bottom outlet 233 in communication with the duct 203 that conveys hot and wet air to the air inlet 204 adjacent to the burner 212.

The structure of the rotary exchanger 231 can be better understood by considering the section shown in FIG. 4. The inlet 232 and the outlet 206 for combustion products extend over half the section of the exchanger 231 while the inlet 202 and the outlet 233 for oxidizing air extend over the other half of the section of the rotary exchanger 231.

The embossing or corrugations 237 separating the rolled-up plates 238 contribute to providing sealing between the channels 234 that at any given instant are carrying oxidizing air and the channels 235 that at the same instant are carrying a counterflow of flue gases. Only those channels which are situated at any given instant in the vicinity of a diametral plane separating the chimney 206 and the inlet 203 on one side from the air inlet 202 and the air outlet 233 on the other side may give rise to a small amount of mixing between the air and the flue gases. Nevertheless, this phenomenon applies to a very small flow rate only which is associated with the small number a of channels involved at any instant in the vicinity of the diametral plane compared with the large total number N of channels through the exchanger. The mixing phenomenon is further limited by the fact that the air and the flue gases are flowing in opposite directions.

Figure 3:
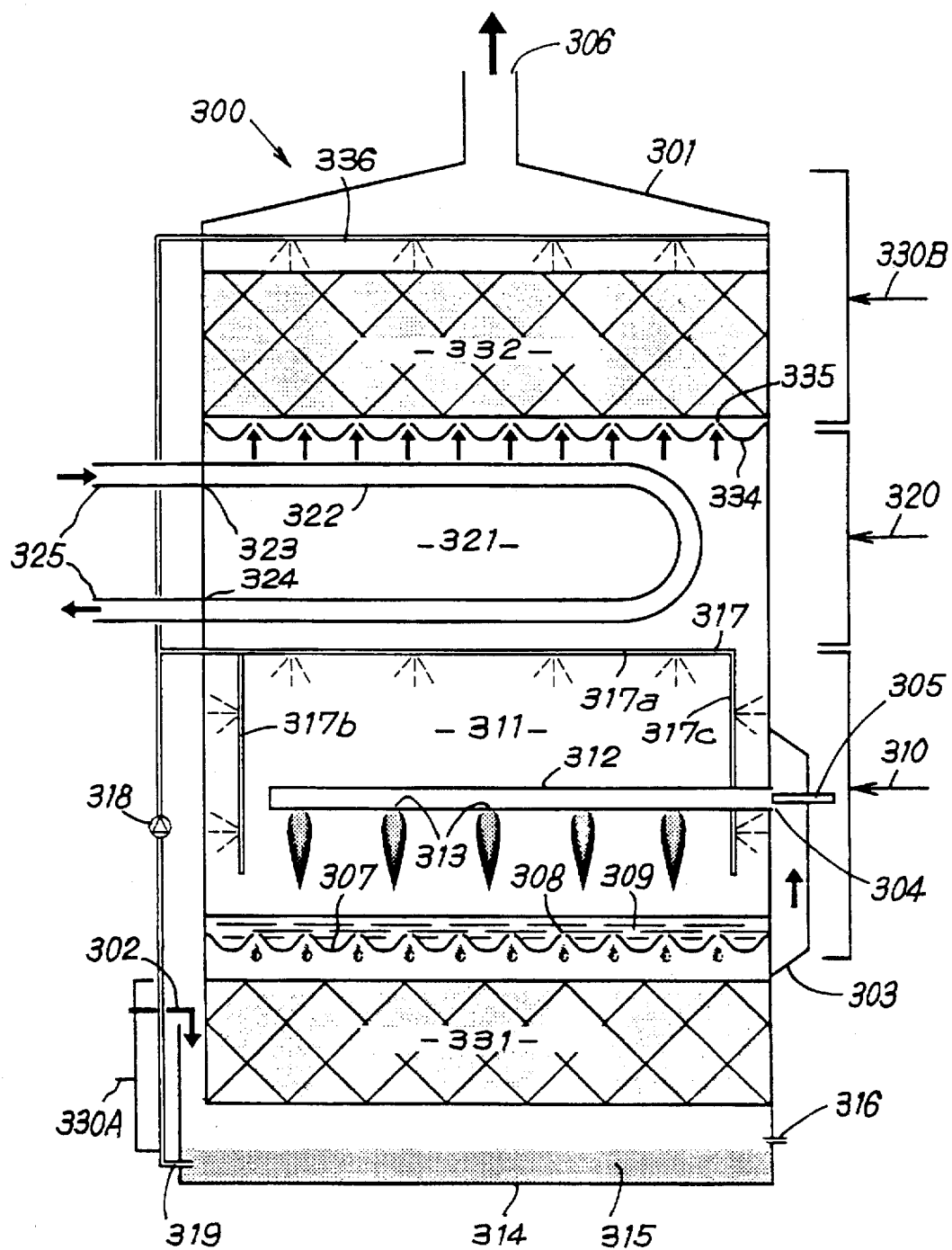
FIG. 3 is a diametrical vertical section view of a third embodiment of a boiler of the invention having three levels of mass and heat exchange, the third mass exchange being implemented in top and bottom zones having the first and second levels of mass exchange sandwiched between them.

FIG. 3 shows a third possible embodiment of a boiler of the invention.

In the boiler 300 of FIG. 3, the first and second modules 310 and 320 disposed inside the enclosure 301 operate essentially in the same manner as in the embodiments of FIGS. 1 and 2, and similar component parts are given the same reference numbers except that the hundreds digits is now a "3" instead of being a "1" or a "2", and these parts are not described in detail again.

However, in FIG. 3, it can be seen that the third module is split into two portions 330A and 330B disposed respectively at the bottom and at the top of the boiler 300, with the first and second modules 310 and 320 being sandwiched between them.

The first portion 330A of the third module is constituted by a scrubber-evaporator comprising a filling 331 or similar ring-shaped elements disposed beneath the first module 310 and having oxidizing air passing upwardly therethrough from an air inlet 302 leading to an empty space beneath the filling 331 and being exhausted in the form of hot wet air via an outlet situated above the filling 331 and in communication with a duct 303 feeding the hot air into the zone 304 for feeding the burner 312 with oxidizing air.

Water is delivered over the filling 331 so as to flow downwards through the scrubber-evaporator 330A, to wet the oxidizing air. The water is recovered in a receptacle 314 fitted with an overflow 316 and constituting a supply or "hydraulic return" 315 for the boiler 300. The water required for feeding the circuit 317 that wets the hearth 311 may be taken from the supply 315 via a pipe 319 and a pump 318. The water required for wetting the filling 331 may itself come from an intermediate supply 309 situated beneath the burner 312 in the first module 310 so as to constitute a supply of water situated beneath the wet hearth 311. The supply of water 309 may be held on a corrugated plate 307 provided with perforations situated in the vicinity of the tops of the corrugations. The water required for wetting the scrubber-evaporator may thus be sprayed in divided form through openings 308 formed through the higher portions of the corrugated plate 307.

The second portion 330B of the third module is constituted by a scrubber-condenser having a filling 332 similar to the filling 331 and disposed above the second module 320, with the combustion gases leaving the second module 320 passing through it upwardly.

Water is dispensed from a strip 336 located above the filling 332 so as to flow downwards through the scrubber-evaporator 330B. The water is advantageously fed to the strip 336 from the supply 315 via the pipe 319 and the pump 318.

Advantageously, a corrugated plate 334 provided with perforations 335 situated in the vicinity of the tops of the corrugations is disposed between the exchanger-condenser 321 and the filling 332. This corrugated plate 334 allows the combustion gases to pass from the exchanger-condenser 321 into the filling 332 of the scrubber-condenser 330B, while simultaneously causing the flow of water collected at the bottom of the lining 332 to be directed towards the vertical walls of the enclosure 301 of the boiler 300.

In the embodiment of FIG. 3, a first mass exchange due to water vaporizing within the wet hearth 311 takes place as in the embodiments of FIGS. 1 and 2, with the only differences within the first module 310 lying in the fact that the hot and wet oxidizing air is fed in from below, and in the fact that an intermediate supply of water 309 is provided between the first module 310 and the scrubber-evaporator 330A.

The second mass exchange within the second module 320 that contains the exchanger-condenser 321 takes place in entirely similar manner in all three embodiments of FIGS. 1 to 3.

The third mass exchange within the water vapor pump of the third module and accompanied by heat exchange likewise takes place in principle in similar manner in all three embodiments, however in FIG. 3, the exchange phenomena are separated into two distinct zones one at the bottom of the boiler and the other at the top thereof, which zones are constituted by the scrubber-evaporator 330A and the scrubber-condenser 330B. In all cases, optimization is performed with respect to exchanges of mass and of heat.

I claim:

1. A boiler for heating a working fluid, the boiler comprising an enclosure into which there penetrates at least one circuit portion for circulating the working fluid, and a hearth which is situated inside the enclosure and in which a fuel gas is subjected to combustion,
wherein the boiler comprises at least:
 a) a first module containing the hearth, a burner fed by said fuel gas, and an internal water circuit for wetting the hearth and creating a first level of mass and heat exchange due to vaporization without heat transfer to the working fluid;
 b) a second module comprising an exchanger-condenser associated with said circuit portion for circulating the working fluid and receiving the combustion gases laden with water vapor coming from the hearth of the first module to create a second level of mass and heat exchange due to condensation transferring the heat energy produced in the first module to an external circuit for working fluid circulation without there being direct contact between the combustion gases and the working fluid; and c) a third module comprising a water vapor pump providing a third level of mass and heat exchange between the combustion gases coming from the second module and the oxidizing air injected into the enclosure via an air inlet, means being provided to direct the oxidizing air to the first module after it has been heated and wetted by passing through the third module, thereby enabling the heated and wetted air to be mixed inside the burner with the fuel gas.

2. A boiler according to claim 1, wherein the internal water circuit comprises devices for injecting water into the top of the wet hearth and devices for projecting water against the vertical side walls of the hearth so as to wet all of the flow of combustion gas in the first module and the vertical walls of the hearth.

3. A boiler according to claim 1, wherein the internal water circuit comprises a supply of water at the bottom of the first module, overflow means for removing excess water from said supply, and means for taking water from said supply to feed said internal water circuit.

4. A boiler according to claim 1, wherein the third module comprises an exchanger formed of a material selected from the group consisting of a porous ceramic membrane, a hydrophilic membrane, and a porous membrane organized in one or more layers, each layer having one face in contact with the oxidizing air injected via said air inlet and its other face in contact with the combustion gases coming from the second module to perform the mass and heat exchange function.

5. A boiler according to claim 1, wherein the third module comprises a rotary exchanger of the honeycomb type constituted by a corrugated plate between two flat plates that are rolled up together, the exchanger being placed vertically, receiving at its bottom end the combustion gases from the second module and at its top end the oxidizing air injected via an air inlet, with the oxidizing air flowing as a counterflow to the combustion gases towards said means for directing the heated and wetted oxidizing air towards the first module, while the combustion gases are exhausted via a stationary chimney at the top of the rotary exchanger.

6. A boiler for heating a working fluid, the boiler comprising an enclosure into which there penetrates at least one circuit portion for circulating the working fluid, and a hearth which is situated inside the enclosure and in which a fuel gas is subjected to combustion, wherein the boiler comprises at least:

a) a first module containing the hearth, a burner fed by said fuel gas, and an internal water circuit for wetting the hearth and creating a first level of mass and heat exchange due to vaporization without heat transfer to the working fluid;

b) a second module comprising an exchanger-condenser associated with said circuit portion for circulating the working fluid and receiving the combustion gases laden with water vapor coming from the hearth of the first module to create a second level of mass and heat exchange due to condensation transferring the heat energy produced in the first module to an external circuit for working fluid circulation without there being direct contact between the combustion gases and the working fluid; and c) a third module comprising a water vapor pump providing a third level of mass and heat exchange between the combustion gases coming from the second module and the oxidizing air injected into the enclosure via an air inlet, means being provided to direct the oxidizing air to the first module after it has been heated and wetted by passing through the third module, thereby enabling the heated and wetted air to be mixed inside the burner with the fuel gas;

wherein the internal water circuit comprises a supply of water at the bottom of the first module, overflow means for removing excess water from said supply, and means for taking water from said supply to feed said internal water circuit; and wherein the third module comprises firstly a scrubber-evaporator disposed beneath the first module and having oxidizing air passing upwards through it from said air inlet located at one end of the said scrubber-evaporator to be subsequently exhausted by said means for directing heated oxidizing air towards the first module, water being applied downwardly to the scrubber-evaporator from said supply of water situated at the bottom of the first module, and secondly a scrubber-condenser disposed above the second module so that the combustion gases leaving the second module pass upwardly through it, and so that the water recovered in an additional supply after passing through the scrubber-evaporator passes through it downwardly.

7. A boiler according to claim 6, including a corrugated plate provided with perforations situated near the tops of the corrugations to define said supply of water at the bottom of the wet hearth and for dispensing the water in highly divided form over the entire section of the scrubber-evaporator.

8. A boiler according to claim 6, including pumping means and dispensing means for feeding both the water circuit of the first module and the water dispensing circuit in the scrubber-condenser from said additional supply which acts as a hydraulic return.

9. A boiler according to claim 6, including a corrugated plate having perforations situated in the vicinity of the tops of the corrugations to allow the combustion gases to pass from the second module containing an exchanger-condenser to the scrubber-condenser while simultaneously taking the flow of water collected from the bottom of the scrubber-condenser and directing it in the form of an appropriately sloping jet against the vertical walls of the boiler so as to avoid showering water onto the exchanger-condenser.

10. A boiler according to claim 1, wherein the burner of the first module comprises one or more strips provided with downwardly directed orifices so that the flames extend towards said supply of water.

11. A boiler according to claim 1, wherein the water circuit of the first module comprises spray strips provided with spray nozzles directed to the various vertical walls of the enclosure, the spray strips being disposed externally relative to the strips of the burner.

12. A boiler according to claim 1, wherein the circuit for circulating the working fluid is a hot water circuit for central heating or for producing hot tap water, and wherein the inlet and outlet temperatures of the circuit portion internal to the second module are respectively about 60° C. to about 80° C., and about 80° C. to about 95° C., and are preferably respectively approximately 70° C. and 90° C.

* * * * *